UNITED STATES PATENT OFFICE 2,221,662

POLYMERIC ESTERS OF UNSATURATED POLYCARBOXYLIC ACIDS WITH ETHYNYL CARBONYLS HAVING AT LEAST ONE HYDROGEN ATOM ATTACHED TO THE ALKYNYL CARBON ATOM

Henry S. Rothrock, Wilmington, Del., assignor to E. I. du Pont de Nemours & Company, Wilmington, Del., a corporation of Delaware No Drawing. Application July 14, 1937, Serial No. 153,669

11 Claims. (Cl. 260—78)

This invention relates to esters, more particularly to polycarboxylic acid esters of certain alkynyl carbinols, and to their preparation and polymerization.

Orthodox methods of preparing esters are insufficient and even ineffective in preparing alkynyl carbinol esters of polycarboxylic acids since, under the influence of acid, the carbinols tend to rearrange. Thus dimethyl ethynyl carbinol, in the presence of formic acid, rearranges to carbonyl compounds such as dimethylacrolein or methyl isopropenyl ketone [Rupe et al., Helv. Chim. Acta 11, 449, 656, 965 (1928); 12, 193 (1929)], and mineral acids at mild temperatures cause darkening of ethynyl carbinols so that direct esterification methods are precluded.

This invention has as an object the preparation of new esters. A further object is the preparation of new molding compositions. A still further object is the preparation of new coating compositions. A still further object is the preparation of new plasticizers and solvents. Other objects will appear hereinafter.

These objects are accomplished by the following invention wherein an alkynyl carbinol in which the carbinol group is joined by a single bond to an acetylenic carbon, is reacted under alkaline conditions with an ester of a polycarboxylic acid with an alcohol more volatile than the alkynyl carbinol. The alkynyl carbinol should be a primary or secondary monohydric alcohol, i. e., the single carbinol carbon atom should have attached thereto at least one hydrogen atom.

It is possible to prepare ethynyl or other alkynyl carbinol esters of polycarboxylic acids in a satisfactory fashion by ester interchange under alkaline conditions and at relatively low temperatures. According to the general process of the present invention, the ethynyl or other alkynyl carbinol is placed in contact with a lower ester of the polycarboxylic acid (such as the methyl or ethyl ester) in the presence of an alkaline catalyst, such as an alkali metal alcoholate. On heating at relatively low temperatures, the ethynyl carbinol displaces the methyl or ethyl alcohol from the polycarboxylic acid ester, and the liberated alcohol is then distilled from the reaction mixture as it is formed. The reaction is very suitably carried out in solution in inert solvents such as benzene or toluene, which serve to assist in the removal of the alcohol of reaction by distillation as a binary mixture. The reaction usually requires from 4 to 8 hours for completion, depending upon the quantity of catalyst, the reactivity of the particular compounds used, and the exact reaction conditions employed. The reaction time can be shortened by using higher temperature, for example, by using less solvent or higher boiling solvents, such as xylene, chlorobenzene, and dichlorodiethyl ether. Large amounts of catalyst aid in shortening the time of reaction. The distillation can ordinarily be carried out at such a rate as to distill the alcohol of reaction (e. g., methanol or ethanol) at about the rate at which it is given off in the interchange. The quantity of alcohol eliminated can be determined readily by washing it from the benzene distillate with water and measuring the change in volume. In this way it is possible to determine the extent of reaction at any time. The reaction products can be worked up in any desired manner. While it is often desirable to wash the reaction product with water and then distill, the invention is not limited to this means of purification.

Ester interchange between the lower ester of the polycarboxylic acid is in large part the simple reaction exemplified by the following formula illustrating the reaction of ethynylcarbinol (propargyl alcohol) with dimethyl fumarate.

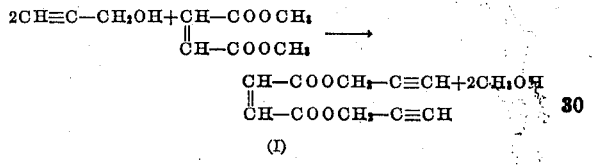

However, under the alkaline reaction conditions employed, a secondary reaction appears to take place to a limited extent if the polycarboxylic acid has α, β-unsaturation as is true in the case of maleic acid, fumaric acid, and 1,4-dihydronaphthalene-1,4-dicarboxylic acid. The exact nature of this reaction has not been definitely determined, but it is believed that one molecule of the ethynyl carbinol adds to one molecule of the polycarboxylic acid ester, as follows:

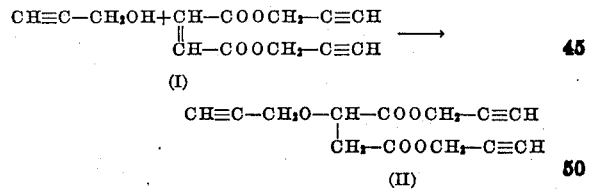

This secondary reaction has not been observed to occur with esters of saturated polycarboxylic acids, and probably it does not take place with esters of unsaturated polycarboxylic acids, such as vinylmalonic, wherein the unsaturation is not adjacent to an ester group.

The extent of the above secondary reaction depends upon the reaction conditions employed. By avoiding an excess of alcohol and using as short reaction time as possible, it may be held to a minimum, although I have not been successful in avoiding it completely. However, the formation of the compounds represented by Formula II above is not necessarily undersirable, and as a matter of fact is considered a part of the invention, particularly since the product is a highly unsaturated molecule, and furthermore is still an ethynyl carbinol ester of a polycarboxylic acid.

There is the possibility also that the lower alcohol (such as methanol) liberated in the interchange reaction may add to the unsaturated double bond of the ester, but since conditions are preferably used which remove this lower alcohol from the reaction mixture about as fast as it is set free, this side reaction can in general occur only to a negligible extent.

Esters of alkynyl carbinols and polycarboxylic acids, particularly unsaturated acids, possess the desirable and very interesting property of polymerizing under suitable conditions to give products of value. Under mild treatment the thin, mobile, monomeric esters can be polymerized or thickened to yield soluble viscous syrups or, under more drastic polymerizing conditions, can be set up to insoluble gels and then finally to hard, solid resins. The viscous soluble polymers possess the very desirable property of polymerizing or "drying" in thin layers to yield hard, flexible, light colored films, and are therefore of definite value in the field of coating compositions. Generally these polymerizations of the viscous syrups in films are carried out in the presence of catalytic proportions of metallic driers, for example, cobalt or manganese linoleate. While the syrups will dry in the air under suitable conditions, the rate of such drying is generally slow and it is much more desirable to use the products in baking compositions. Thus, good films may be obtained as a rule on baking for a short time at 100° C.

The more detailed practice of the invention is illustrated by the following examples, wherein parts given are by weight unless otherwise stated. There are of course many forms of the invention other than these specific embodiments.

EXAMPLE I

*Propargyl fumarate*

A mixture of 28 parts of propargyl alcohol, (CH≡C—CH₂OH, B. P. 111–114° C.), 24 parts of dimethyl fumarate, and 150 parts of dry benzene was heated at reflux under an efficient column equipped with a variable take-off. To the boiling mixture was added carefully, in small portions, a sodium methylate catalyst solution prepared by dissolving five parts of metallic sodium in 100 parts of absolute methanol. The rate of addition of the catalyst was adjusted so as to maintain the interchange reaction at a uniform rate. The methanol liberated by the reaction was removed by distillation, the temperature of the binary mixture at the top of the column being held at about 58° C. by suitably adjusting the rate of distillation. Fresh benzene was added to the reaction mixture from time to time to replace that distilled off. The reaction required about four hours for completion. At the end of this time, the temperature rose gradually, finally arriving and remaining at 80° C. The product was thoroughly washed with water; benzene was removed by distillation; and finally the ester was distilled at reduced pressure. The product solidified in the condenser as a light colored semi-solid crystalline mass. This product, which consisted largely of dipropargyl fumarate, polymerized slowly at 100° C. in the presence of benzoyl peroxide, forming finally a hard, brittle, insoluble resin.

EXAMPLE II

*Adipate of iso-propyl ethynyl carbinol*

Sixty and six-tenths (60.6) parts of diethyl adipate, 98 parts of isopropyl ethynyl carbinol ((CH₃)₂CH—CHOH—C≡CH, B. P. 129–132° C.), and 150 g. of dry benzene was heated at reflux under an efficient column equipped with a variable take-off. To the hot mixture was then added portionwise 8 parts of a catalyst prepared by dissolving 5 parts of sodium in 100 parts of absolute methanol. The distillation of benzene-methanol vapors was carried out at such a rate that the distilling temperature was maintained at 65–70° C. The reaction proceeded readily, as evidenced by the quantity of the binary evolved. After 1¼ hours, 80 parts of benzene was added to replace that distilled and 4 parts more catalyst was added. At the end of 3¾ hours, the temperature of vapor at the top of the column was close to 80° C., but the heating was continued for 2¼ hours longer to insure as complete reaction as possible. The contents of the distilling flask were washed with water, the benzene distilled at atmospheric pressure, and the residue at reduced pressure. A total of 76 g. of product boiling at 150–163° C./3 mm. (mainly at 155–160° C./3 mm.) was obtained. This was the desired ester of adipic acid and isopropylethynylcarbinol.

On applying the method described above to the production of an ester from diethyl adipate and dimethyl ethynyl carbinol, $$(CH_3)_2COH—C≡CH,$$

no reaction took place on heating for about 20 hours and the diethyl adipate was recovered unchanged. This indicated that tertiary alkynyl carbinols probably cannot be employed in the present invention.

The invention is applicable to the preparation of polycarboxylic acid esters of alcohols wherein the carbon of the carbinol group is attached to at least one hydrogen atom and, by means of a single bond, to an acetylenic carbon, and the process of the invention is generic to these alcohols. These alcohols have the comprehensive formula R—C≡C—CHR'—OH, wherein R and R' are hydrogen or hydrocarbon radicals, such as alkyl, aryl, aralkyl, or cycloalkyl radicals. They may furthermore be saturated or unsaturated, or straight or branched chain radicals. Specific examples of suitable carbinols are β-methylethynylcarbinol (CH₃—C≡C—CH₂OH), β-butylethynylcarbinol, β-phenylethynylcarbinol, β-benzylethynylcarbinoal, β-cyclohexylethynylcarbinol, β-allylethynylcarbinol, β-tert-butylethynylcarbinol, methyl ethynyl carbinol $$(CH_3—CHOH—C≡CH),$$

hexyl ethynyl carbinol, allyl ethynyl carbinol, phenyl ethynyl carbinol, and isopropyl β-ethylethynyl carbinol. I prefer to employ alcohols that are entirely aliphatic in character and of relatively low molecular weight, i. e., having up to about 8 carbon atoms.

The invention is generic to polycarboxylic acids, which may be aliphatic, hydroaromatic, aromatic, or alicyclic; saturated or unsaturated; straight or branched chain; and unsubstituted or substituted by groups that are relatively stable under the conditions of the process, such as hydroxyl, ether, halogen, nitro, and the like. Suitable specific acids include oxalic, malonic, iso-succinic, butylmalonic, succinic, adipic, sebacic, hexahydrophthalic, pinic, diphenic, benzophenonedicarboxylic, phthalic, terephthalic, naphthalenedicarboxylic, quinolinic, dilactylic, citric, tartaric, malic, keptopimelic, mellitic, tricarboxylic, and $\alpha,\alpha,\beta,\gamma$-propanetetracarboxylic. Unsaturated polycarboxylic acids are a particularly valuable class for use in the invention, examples of such being maleic, fumaric, itaconic, vinylmalonic, citraconic, aconitic, tetrahydrophthalic, 1,2-dihydronaphthalene-3,4-dicarboxylic, 1,4-dihydronaphthalene-2,3-dicarboxylic, and 1,4-dihydronaphthalene-1,4-dicarboxylic acids.

In place of the sodium methylate catalyst used for the ester interchange reaction, other alkaline materials may be used. Thus sodium ethylate or other alkali metal alcoholates in general may be employed. It is desirable, however, to use sodium alkoxides prepared from lower alcohols since the excess alcohol used in preparing catalyst solution is then readily removed from the reaction mixture in the same fashion as is the alcohol forced by the interchange. Suitable catalysts may also be prepared by dissolving an alkali metal in the alkynyl carbinol used in the reaction. It is also possible to use concentrated solutions of alkali hydroxides in lower alcohols in place of the alkali metal alkoxides. Furthermore, alkali hydroxides may be used in the solid form, although when this is done it is difficult to obtain satisfactory solution of the hydroxide in the reacting mixture in some cases. Alkali metals when added in the solid form directly to the reaction mixture also serve as catalysts. Litharge or calcium oxide may be used as catalysts. In general the catalyst requirement is that the reaction mixture should be maintained on the alkaline side, and all alkaline materials are therefore effective to a greater or less extent.

Benzene has been given in the examples as a typical solvent for the present process. This hydrocarbon is very satisfactory since it serves to maintain a low reaction temperature and also is a good medium for removing the alcohol of reaction by distillation as a binary. Toluene may be employed in an equivalent manner although generally the reaction temperature in the flask will then be somewhat higher. Any inert solvent material which is relatively low boiling (to facilitate separation from the higher boiling esters) and which is a solvent for the various components of the reaction may be used. Chlorinated aliphatic hydrocarbons such as ethylene dichloride and carbon tetrachloride may be used as well as aromatic hydrocarbons. Reactive solvents such as methyl acetate or acetone, however, are not satisfactory. The proportion of the solvent used in the reaction mixture may be varied from very small amounts to quite large quantities. In general, it may be said that the use of smaller amounts of solvents favors more rapid reaction.

It is possible to operate in the absence of an added inert solvent but to do so requires more careful temperature control and at the same time makes more difficult the removal of the alcohol of reaction.

In forming these esters of polycarboxylic acids, it is desirable to employ an excess of the alkynyl carbinol. This excess need not be great but should be sufficient to insure complete reaction. In general, the excess should be in the neighborhood of at least 10% and the use of larger proportions of the alkynyl carbinol is permissible since it is possible to recover the unreacted portion from the final reaction product. As pointed out previously, the formation of the addition product of the alkynyl carbinol with the ester of the $\alpha$-$\beta$-unsaturated acid can be controlled to some extent by the amount of excess alkynyl carbinol used throughout the reaction. Large excesses of alkynyl carbinol favor formation of a greater proportion of addition product.

Polymerizations of these new alkynyl carbinol esters may be carried out in any desired manner. Oxygen-yielding catalysts, for example, benzoyl peroxide, are particularly suitable for use in promoting the polymerization although it is possible to operate in the absence of a catalyst. At low temperatures, the polymerizations are generally slow and best results are obtained by heating in the neighborhood of 50–100° C. It is also feasible to carry out the polymerization at still higher temperatures, i. e., 150° C. or even 200° C., although at these high temperatures considerable darkening and decomposition of the acetylenic esters often takes place. The rate of polymerization depends upon the particular ester under consideration, esters of unsaturated acids polymerizing, for example, at a considerably more rapid rate. Soluble viscous polymers of these alkynyl carbinol esters may be obtained if desired by stopping the polymerization at the intermediate soluble form, which is then capable of being converted further to the final highly polymerized form in films.

The esters of this invention constitute a new class of materials which are valuable in the unpolymerized form as solvents and plasticizers. They are particularly useful as plasticizers in various types of plastic and coating compositions, because of their very high boiling points and low volatility. They are, for example, useful in combination with cellulose acetate, cellulose nitrate, ethyl cellulose, and other cellulose esters and/or ethers. In coating compositions, the esters may be used in both the partially polymerized (bodied) form and the unbodied monomeric form since the high boiling points of the esters prevent or retard the evaporation of unpolymerized esters prior to complete setup of the film. Enamels may also be prepared by incorporating pigments with the esters. These esters may be interpolymerized with other polymerizable compounds such as vinyl esters, acrylic or methacrylic esters, butadiene, styrene, vinyl chloride, etc., to form products useful in either coating or molding applications. In general, interpolymers may be made with compounds having the vinylidene radical

The above description and examples are intended to be illustrative only. Any modification of or variation therefrom which conforms to the spirit of the invention is intended to be included within the scope of the claims.

I claim:
1. Process which comprises heating, under reflux, one mole of dimethyl fumarate with three moles of propargyl alcohol in the presence of benzene and sodium methylate, and removing the methanol formed.
2. Process which comprises heating, under re- flux, and in the presence of an inert organic solvent and an alkali metal alcoholate, one mole of an ester of an unsaturated polycarboxylic acid with at least 1.1 moles of an ethynylcarbinol, said ethynylcarbinol being less volatile than the alcohol of the polycarboxylate ester and having at least one hydrogen atom on the carbinol carbon atom.

3. Process which comprises reacting, in the presence of an alkaline alkali metal compound and of an inert organic solvent, one mole of an ester of a polycarboxylic acid with at least one mole of an alkynylcarbinol less volatile than the alcohol of the polycarboxylate ester and having at least one hydrogen on the carbinol carbon atom which is in turn joined, by a single bond, to an acetylenic carbon atom.

4. Process which comprises reacting, under alkaline conditions and in the presence of an inert organic solvent, one mole of an ester of a polycarboxylic acid with at least one mole of an alkynylcarbinol less volatile than the alcohol of the polycarboxylate ester and having at least one hydrogen on the carbinol carbon atom which is in turn joined, by a single bond, to an acetylenic carbon atom.

5. Propargyl fumarate.

6. Polymeric propargyl fumarate.

7. A resinous polymeric propargyl ester of an unsaturated polycarboxylic acid.

8. A resinous polymeric ester of an unsaturated polycarboxylic acid with an ethynylcarbinol having at least one hydrogen atom attached to the carbinol carbon atom.

9. A resinous polymeric ester of a polycarboxylic acid with an ethynylcarbinol having at least one hydrogen atom attached to the carbinol carbon atom.

10. A resinous polymeric ester of a polycarboxylic acid with an alkynylcarbinol wherein the carbinol carbon atom is attached by single bonds to an acetylenic carbon atom and to at least one hydrogen atom.

11. A resinous polymeric ester of a polycarboxylic acid with an alcohol of the formula $$R—C\equiv C—CHR'—OH$$

wherein R and R' are members of the class consisting of hydrogen and hydrocarbon radicals.

HENRY S. ROTHROCK.

CERTIFICATE OF CORRECTION.

Patent No. 2,221,662. November 12, 1940.

HENRY S. ROTHROCK.

It is hereby certified that error appears in the above numbered patent requiring correction as follows: In the grant, line 7, and in the heading to the printed specification, title of invention, for "CARBONYLS" read --CARBINOLS--; page 2, first column, line 10, for "undersirable" read --undesirable--; and second column, line 64, for the syllable "zylethynylcarbinoal" read --zylethynylcarbinol--; page 3, first column, line 12, for "keptopimelic" read --ketopimelic--; line 30, for the word "forced" read --formed--; and that the said Letters Patent should be read with this correction therein that the same may conform to the record of the case in the Patent Office.

Signed and sealed this 11th day of February, A. D. 1941.

(Seal)

Henry Van Arsdale,
Acting Commissioner of Patents.